United States Patent
Shipp et al.

(10) Patent No.: US 10,920,644 B2
(45) Date of Patent: Feb. 16, 2021

(54) COMBUSTION AND THERMAL MANAGEMENT STRATEGIES USING VARIABLE VALVE TIMING

(71) Applicant: Cummins Inc., Columbus, IN (US)

(72) Inventors: Timothy Shipp, Seymour, IN (US); Marten H. Dane, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/519,654

(22) Filed: Jul. 23, 2019

(65) Prior Publication Data

US 2019/0345863 A1    Nov. 14, 2019

Related U.S. Application Data

(63) Continuation of application No. PCT/US2018/015698, filed on Jan. 29, 2018.

(60) Provisional application No. 62/453,326, filed on Feb. 1, 2017.

(51) Int. Cl.
| | |
|---|---|
| *F01N 9/00* | (2006.01) |
| *F02D 41/00* | (2006.01) |
| *F02D 41/02* | (2006.01) |
| *F02M 26/33* | (2016.01) |

(52) U.S. Cl.
CPC ............ *F01N 9/00* (2013.01); *F02D 41/0007* (2013.01); *F02D 41/024* (2013.01); *F02M 26/33* (2016.02)

(58) Field of Classification Search
CPC ...... F01N 9/00; F02D 41/0007; F02D 41/024; F02D 13/0203; F02D 41/0245; F02D 41/401; F02D 13/0249; F02M 26/33

USPC .......................................... 60/274, 285, 286
See application file for complete search history.

(56) References Cited

U.S. PATENT DOCUMENTS

| | | |
|---|---|---|
| 7,204,227 B2 | 4/2007 | Leone et al. |
| 7,246,595 B1 | 7/2007 | Hoare et al. |
| 7,370,633 B2 | 5/2008 | Kang et al. |
| 7,398,644 B2 | 7/2008 | Leone et al. |
| 7,832,197 B2 | 11/2010 | Leone |
| 7,841,316 B2 | 11/2010 | Inoue |
| 2001/0050067 A1 | 12/2001 | Sato |
| 2004/0089250 A1 | 5/2004 | Iwashita et al. |
| 2004/0107927 A1* | 6/2004 | Sellnau ............. F01L 13/0036 123/90.16 |
| 2006/0016422 A1* | 1/2006 | Kuo ................... F02D 13/0273 123/299 |
| 2006/0196468 A1 | 9/2006 | Chang et al. |
| 2007/0062179 A1 | 3/2007 | Leone |
| 2009/0205612 A1 | 8/2009 | Wermuth et al. |
| 2010/0071660 A1* | 3/2010 | Hoshi .................. F02D 41/401 123/435 |
| 2014/0158100 A1 | 6/2014 | Williams et al. |

(Continued)

OTHER PUBLICATIONS

Search Report and Written Opinion, PCT Appln. No. PCT/US2018/015698, dated Apr. 6, 2018, 8 pgs.

*Primary Examiner* — Hoang M Nguyen
(74) *Attorney, Agent, or Firm* — Taft Stettinius & Hollister LLP

(57) ABSTRACT

A system and method for thermal management of an aftertreatment component are described. The disclosed method can employ any one or combination of operating modes that obtain a target condition of the exhaust gas to support or initiate thermal management of the aftertreatment device.

20 Claims, 4 Drawing Sheets

(56) References Cited

U.S. PATENT DOCUMENTS

2014/0305101 A1* 10/2014 Katou .................. F02D 41/025
60/285
2015/0159588 A1* 6/2015 Geckler ............. F02D 13/0265
123/672

* cited by examiner

COMBUSTION AND THERMAL MANAGEMENT STRATEGIES USING VARIABLE VALVE TIMING

CROSS REFERENCE TO RELATED APPLICATION

The present application is a continuation of PCT Application No. PCT/US18/15698, filed Jan. 29, 2018 which claims the benefit of the filing date of U.S. Provisional Application Ser. No. 62/453,326 filed on Feb. 1, 2017, each of which are incorporated herein by reference.

FIELD OF THE INVENTION

This disclosure relates generally to internal combustion engine operation, and more particularly to systems and methods for combustion and thermal management of internal combustion engine operations.

BACKGROUND

Thermal management of the aftertreatment system and/or intake flow of an internal combustion engine can provide operational benefits such as more efficient combustion processes and more effective aftertreatment device operations. While turbochargers with variable geometry (VG) inlets have been used to increase exhaust temperatures, VG turbochargers are more costly than wastegated turbochargers. Exhaust heaters are also expensive and require a generator to create energy to run the heater. Exhaust throttles are costly and have reliability concerns. Other strategies such as hydrocarbon (HC) dosing, cylinder deactivation, and early exhaust valve opening have also been used for thermal management of aftertreatment systems but could be more effective. Therefore, further improvements in this technology are needed.

SUMMARY

A system and method for controlling exhaust temperatures and exhaust gas flows for thermal and combustion management of a multi-cylinder internal combustion engine are disclosed.

In some embodiments, the system and/or methods are employed with an internal combustion engine including a plurality of cylinders for producing exhaust gas treated by at least one aftertreatment device, the system also including at least one turbocharger and a fueling system. The at least one aftertreatment device can include, for example, a catalyst and/or a particulate filter. The reciprocating engine can be a four-stroke engine. The turbocharger can include a wastegate to bypass a turbine. The fuel injector can be a common-rail type fuel injector, although other fueling systems are also contemplated. The systems and methods described herein can be employeed without a variable geometry turbine and/or exhaust throttle for controlling aftertreatment system temperature, although the inclusion of the same is not precluded in all embodiments.

The systems and methods include selecting one or more operation modes in which a target condition or target conditions of the exhaust gas/aftertreatment temperature are obtained. The one or more operation modes can include advancing an exhaust valve opening and closing timing relative to a nominal opening and closing timing to provide recompression of cylinder gases as the exhaust valve is closed before the piston reaches top dead center on the exhaust stroke.

The one or more operation modes can further include a very late post injection of fuel during recompression to provide a temperature and pressure rise in the cylinder, which increases pumping work and can be used for thermal management. In addition, exhaust gases from the cylinder are internally recirculated into the intake manifold as the intake valve opens for the intake stroke of the piston. This internal exhaust gas recirculation (EGR) increases the temperature of the charge flow in the intake manifold pre-combustion. The pre-heated charge flow begins the next combustion cycle at a higher temperature which ends the combustion cycle at a higher temperature. In addition, NOx reduction is provided with the internal exhaust gas recirculation.

In yet a further operation mode, the intake valve opening is retarded or delayed during the intake stroke, which extracts further work from the very late injection provided during recompression of the in-cylinder gases. The delayed intake valve opening allows further pre-heating of the in-cylinder charge and the creation of EGR constituents at the start of the next combustion cycle when the intake valve is opened. In one embodiment, the intake valve is timed to open when the in-cylinder pressure is at or around the intake manifold pressure.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

Figure 1:
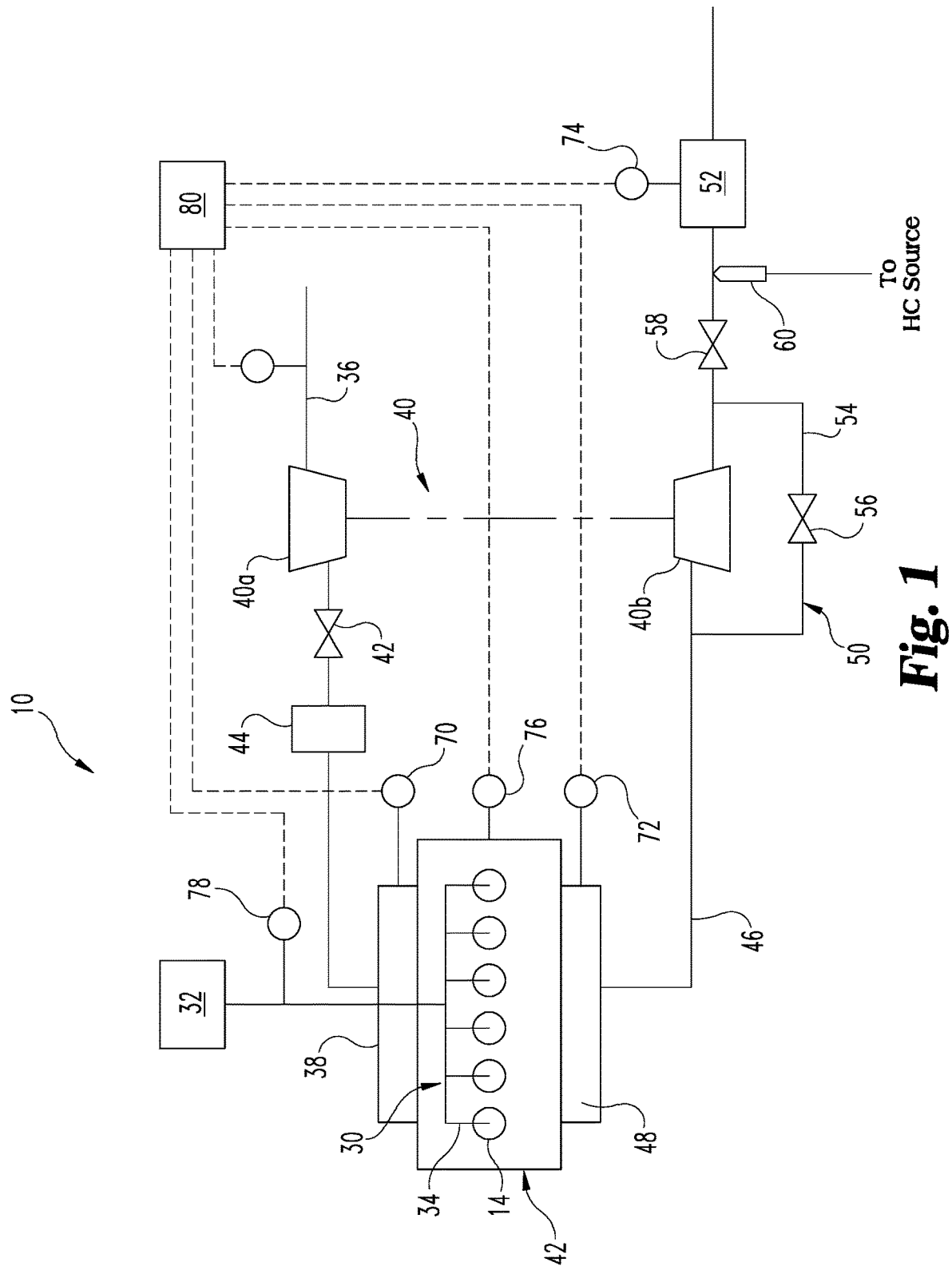
FIG. 1 shows one embodiment of an internal combustion engine system in which combustion and thermal outputs are managed.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, a system 10 includes a four-stroke internal combustion engine 12. FIG. 1 illustrates an embodiment where the engine 12 is a diesel engine, but any engine type is contemplated, including compression ignition, spark-ignition, and combinations of these. The engine 12 can include a plurality of cylinders 14. FIG. 1 illustrates the plurality of cylinders 14 in an arrangement that includes six cylinders in an in-line arrangement for illustration purposes only. Any number of cylinders and any arrangement of the cylinders suitable for use in an internal combustion engine can be utilized. The number of cylinders 14 that can be used can range from one cylinder to eighteen or more. Furthermore, the following description at times will be in reference to one of the cylinders 14. It is to be realized that corresponding features in reference to the cylinder 14 described in FIG. 2 and at other locations herein can be present for all or a subset of the other cylinders of engine 12.

Figure 2:
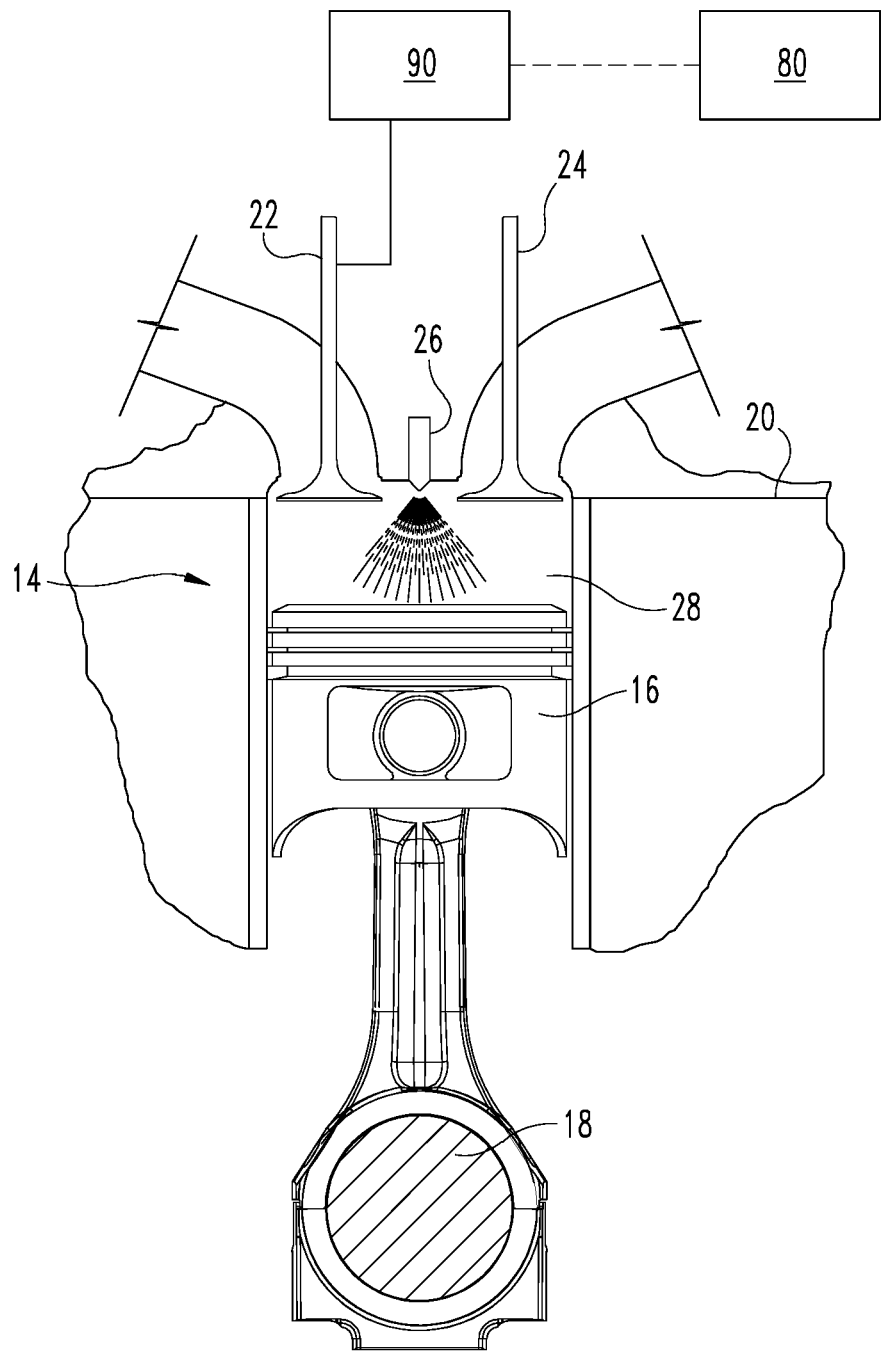
FIG. 2 is a schematic of a cylinder of the engine of the system of FIG. 1.

As shown in FIG. 2, the cylinder 14 houses a piston 16 that is operably attached to a crankshaft 18 that is rotated by reciprocal movement of piston 16 in cylinder 14. Within a cylinder head 20 of the cylinder 14, there is at least one intake valve 22, at least one exhaust valve 24 and a fuel injector 26 that provides fuel to a combustion chamber 28 formed by cylinder 14 between the piston 16 and the cylinder head 20. In other embodiments, fuel can be provided to combustion chamber 28 by port injection, or by injection in the intake system, upstream of combustion chamber 28.

The term "four-stroke" herein means the following four strokes—intake, compression, power, and exhaust—that the piston 16 completes during two separate revolutions of the engine's crankshaft 18. A stroke begins either at a top dead center (TDC) when the piston 16 is at the top of cylinder head 20 of the cylinder 14, or at a bottom dead center (BDC), when the piston 16 has reached its lowest point in the cylinder 14.

During the intake stroke, the piston 16 descends away from cylinder head 20 of the cylinder 14 to a bottom (not shown) of the cylinder, thereby reducing the pressure in the combustion chamber 28 of the cylinder 14. In the instance where the engine 12 is a diesel engine, a combustion charge is created in the combustion chamber 28 by an intake of air through the intake valve 22 when the intake valve 22 is opened.

The fuel from the fuel injector 26 is supplied by a high pressure common-rail system 30 that is connected to the fuel tank 32. Fuel from the fuel tank 32 is suctioned by a fuel pump (not shown) and fed to the common-rail fuel system 30. The fuel fed from the fuel pump is accumulated in the common-rail fuel system 30, and the accumulated fuel is supplied to the fuel injector 26 of each cylinder 14 through a fuel line 34. The accumulated fuel in common rail system can be pressurized to boost and control the fuel pressure of the fuel delivered to combustion chamber 28 of each cylinder 14

During the compression stroke, both the intake valve 22 and the exhaust valve 24 are closed, the piston 16 returns toward TDC and fuel is injected near TDC in the compressed air in a main injection event, and the compressed fuel-air mixture ignites in the combustion chamber 28 after a short delay. In the instance where the engine 12 is a diesel engine, this results in the combustion charge being ignited. The ignition of the air and fuel causes a rapid increase in pressure in the combustion chamber 28, which is applied to the piston 16 during its power stroke toward the BDC. Combustion phasing in combustion chamber 28 is calibrated so that the increase in pressure in combustion chamber 28 pushes piston 16, providing a net positive in the force/work/power of piston 16.

During the exhaust stroke, the piston 16 is returned toward TDC while the exhaust valve 24 is open. This action discharges the burnt products of the combustion of the fuel in the combustion chamber 28 and expels the spent fuel-air mixture (exhaust gas) out through the exhaust valve 24.

The intake air flows through an intake passage 36 and intake manifold 38 before reaching the intake valve 22. The intake passage 36 may be connected to a compressor 40a of a turbocharger 40 and an optional intake air throttle 42. The intake air can be purified by an air cleaner (not shown), compressed by the compressor 40a and then aspirated into the combustion chamber 28 through the intake air throttle 42. The intake air throttle 42 can be controlled to influence the air flow into the cylinder.

The intake passage 36 can be further provided with a cooler 44 that is provided downstream of the compressor 40a. In one example, the cooler 44 can be a charge air cooler (CAC). In this example, the compressor 40a can increase the temperature and pressure of the intake air, while the CAC 44 can increase a charge density and provide more air to the cylinders. In another example, the cooler 44 can be a low temperature aftercooler (LTA). The CAC 44 uses air as the cooling media, while the LTA uses coolant as the cooling media.

The exhaust gas flows out from the combustion chamber 28 into an exhaust passage 46 from an exhaust manifold 48. The exhaust passage 46 is connected to a turbine 40b and a wastegate 50 of the turbocharger 40. Exhaust gas then flows into an aftertreatment system 52 that includes one or more aftertreatment devices. The exhaust gas that is discharged from the combustion chamber 28 drives the turbine 40b to rotate. The wastegate 50 is a device that enables part of the exhaust gas to by-pass the turbine 40b through a passageway 54. Less exhaust gas energy is thereby available to the turbine 40b, leading to less power transfer to the compressor 40a. Typically, this leads to reduced intake air pressure rise across the compressor 40a and lower intake air density/flow. The wastegate 50 can include a control valve 56 that can be an open/close valve, or a full authority valve allowing control over the amount of by-pass flow or anything between. The exhaust passage 46 can further or alternatively include an exhaust throttle 58 for adjusting the flow of the exhaust gas through the exhaust passage 46. The exhaust gas, which can be a combination of by-passed and turbine flow, then enters the aftertreatment system 52.

Optionally, a part of the exhaust gas can be recirculated into the intake air via an EGR passage (not shown.) The EGR passage can be connected the exhaust passage upstream of the turbine 40b to the intake passage 36 downstream of the intake air throttle 42. Alternatively or additionally, a low pressure EGR system (not shown) can be provided downstream of turbine 40b and upstream of compressor 40a. An EGR valve can be provided for regulating the EGR flow through the EGR passage. The EGR passage can be further provided with an EGR cooler and a bypass around the EGR cooler.

The aftertreatment system 52 may include one or more devices useful for handling and/or removing material from exhaust gas that may be harmful constituents, including carbon monoxide, nitric oxide, nitrogen dioxide, hydrocarbons, and/or soot in the exhaust gas. In some examples, the aftertreatment system 52 can include at least one of a catalytic device and a particulate matter filter. The catalytic device can be a diesel oxidation catalyst (DOC) device, ammonia oxidation (AMOX) catalyst device, a selective catalytic reduction (SCR) device, three-way catalyst (TWC), lean NOX trap (LNT) etc. The reduction catalyst can include any suitable reduction catalysts, for example, a urea selective reduction catalyst. The particulate matter filter can be a diesel particulate filter (DPF), a partial flow particulate filter (PFF), etc. A PFF functions to capture the particulate matter in a portion of the flow; in contrast the entire exhaust gas volume passes through the particulate filter.

The arrangement of the components in the aftertreatment system 52 can be any arrangement that is suitable for use with the engine 12. For example, in one embodiment, a DOC and a DPF are provided upstream of a SCR device. In one example, a reductant delivery device is provided between the DPF and the SCR device for injecting a reductant into the exhaust gas upstream of the SCR device. The reductant can be urea, diesel exhaust fluid, or any suitable reductant injected in liquid and/or gaseous form.

The exhaust passage 46 can further include a hydrocarbon (HC) injector 60 that is provided downstream of turbine 40b and upstream of aftertreatment system 52. The HC injector 60 can inject hydrocarbons, which can be, for example, fuel from fuel tank 32 or a secondary storage source of hydrocarbons. The hydrocarbons can be from any suitable hydrocarbon containing fluid or a reformate. In one embodiment, the injection of the hydrocarbons can increase the temperature of the exhaust gas through oxidation of the injected hydrocarbons across a DOC and the concomitant release of energy. In one example, injection occurs when the DOC is sufficiently above the light-off temperature of the hydrocarbons to maintain hydrocarbon slip past the DOC below an acceptable level.

A controller 80 is provided to receive data as input from various sensors, and send command signals as output to various actuators. Some of the various sensors and actuators that may be employed are described in detail below. The controller 80 can include, for example, a processor, a memory, a clock, and an input/output (I/O) interface.

The system 10 includes various sensors such as an intake manifold pressure/temperature sensor 70, an exhaust manifold pressure/temperature sensor 72, one or more aftertreatment sensors 74 (such as a differential pressure sensor, temperature sensor(s), pressure sensor(s), constituent sensor(s)), engine sensors 76 (which can detect the air/fuel ratio of the air/fuel mixture supplied to the combustion chamber, a crank angle, the rotation speed of the crankshaft, etc.), and a fuel sensor 78 to detect the fuel pressure and/or other properties of the fuel, common rail 38 and/or fuel injector 26. Any other sensors known in the art for an engine system are also contemplated.

System 10 can also include various actuators for opening and closing the intake valves 22, for opening and closing the exhaust valves 24, for injecting fuel from the fuel injector 26, for injecting hydrocarbons from the HC injector 60, for opening and closing the wastegate valve 56, for the intake air throttle 42, and/or for the exhaust throttle 58. The actuators are not illustrated in FIG. 1, but one skilled in the art would know how to implement the mechanism needed for each of the components to perform the intended function. Furthermore, in one embodiment, the actuators for opening and closing the intake and exhaust valves 22, 24 is a variable valve actuation (VVA) mechanism 90 such as shown in FIG. 2. Any known VVA mechanism for controlling the opening and closing timing of the intake valves 22 and/or exhaust valves 24 is contemplated for VVA mechanism 90.

Figure 3:
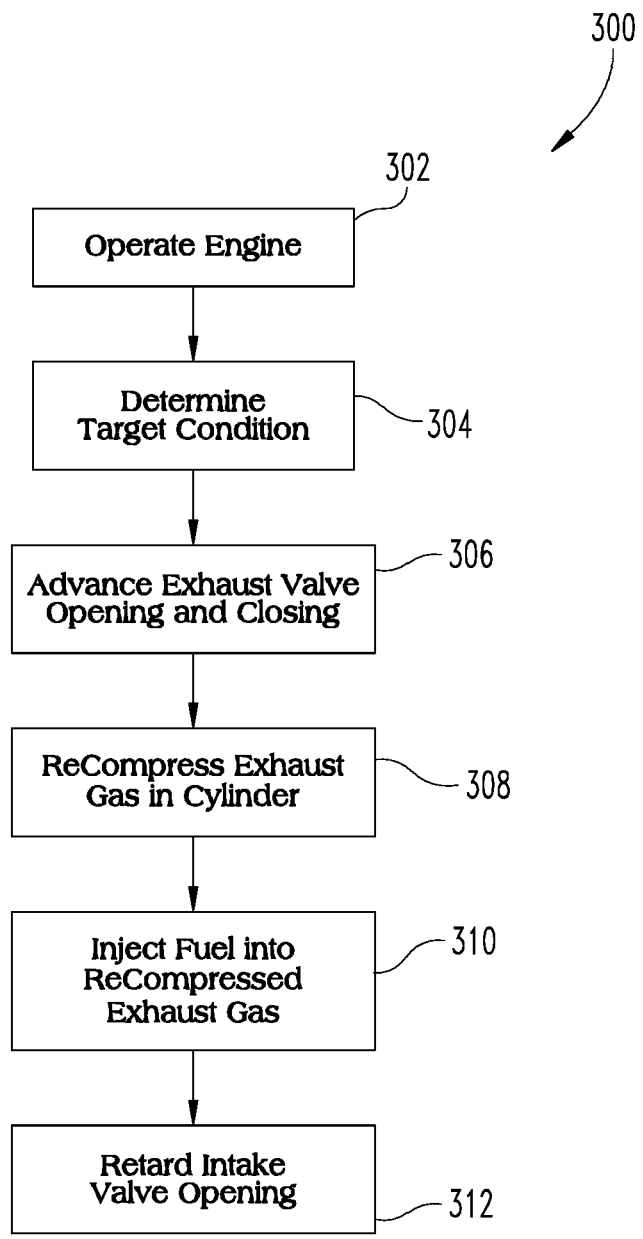
FIG. 3 shows a flow diagram of one embodiment of a procedure for managing combustion and thermal outputs of the engine.

During operation of the engine, the controller 80 can receive information from the various sensors listed above through the I/O interface, process the received information using the processor based on an algorithm stored in the memory, and then send command signals to the various actuators through the I/O interface. For example, the controller 80 can receive information regarding a temperature input, process the temperature input, and then based on the temperature input and control strategy, send one or more command signals to one or more actuators to increase a temperature of the exhaust gas to achieve a target condition for combustion and thermal management of system 10, such as shown for procedure 300 in FIG. 3.

The controller 80 can be configured to implement the disclosed combustion and thermal management strategies using VVA mechanism 90 and fuel system 30 during operation of the engine at operation 302. In one embodiment, the disclosed method and/or controller configuration include selecting one or more operation modes in which a target condition or target conditions of the exhaust gas are determined or obtained at operation 304, such as a target aftertreatment temperature and/or target exhaust gas temperature. The one or more operation modes can include an operation 306 to advance an exhaust valve opening and closing of exhaust valve(s) 24 associated with the exhaust stroke of the piston 16 to provide, at operation 308, recompression of in-cylinder combustion gases since the exhaust valve 25 is closed or nearly closed before the piston 16 reaches top dead center on the exhaust stroke. The disclosed system and method provides five events over the four strokes of each cycle in the following order: an intake event, a compression event, a combustion event, and exhaust event, and a recompression event.

In one specific embodiment, the exhaust valve closing and opening are advanced 30 degrees from baseline so the exhaust valve closes at or near 30 degrees before TDC of the exhaust stroke. In one embodiment, the baseline EVO crank angle degrees is 120 degrees and the baseline EVC crank angle degrees is 400 degrees. In another embodiment, the exhaust valve opening and closing are advanced 40 crank angle degrees or more from the baseline so the exhaust valve is closed at or near 40 degrees before TDC of the exhaust stroke. In addition, earlier opening of the exhaust valve 24 during the power/expansion stroke of piston 16 is beneficial for turbine inlet temperature of turbine 40a since less work is extracted from the fuel injected into the cylinder 14 during the main injection event.

The one or more operation modes can further include an operation 310 to perform a very late post injection of fuel from fuel system 30 during recompression of the exhaust gases in cylinder 14 while the exhaust valve 24 is closed to provide a temperature and pressure rise in the cylinder 14, which increases pumping work and can be used for thermal management. The very late post injection is after combustion of the normal or main injection event has been completed, and is smaller in quantity than the main injection since there is less oxygen in the cylinder. The main injection event occurs during the expansion/combustion stroke, while the late post injection described herein occurs during the exhaust stroke after the exhaust valve 24 is closed early.

The normal or main fuel injection event can be selected, for example, from a set of engine parameter operating maps as a function of engine speed and torque demand, and the main injection timing and quantity and the rail pressure and can be calibrated as a function of engine speed and load. The very late post injection is a fuel amount in addition to the main fuel injection (which may include multiple injections) and is provided for combustion and thermal management and not for satisfying engine load conditions.

In addition, exhaust gases from the cylinder 14 are internally recirculated into the intake manifold 38 as the intake valve 22 opens. This internal EGR increases the temperature of the charge flow in the intake manifold 38 pre-combustion. The pre-heated charge flow begins the next combustion cycle at a higher temperature which ends the combustion cycle at a higher temperature. In one embodiment, the amount of the late post combustion injection provided during recompression is controlled to provide a desired internal EGR fraction target and/or a desired NOX reduction.

In yet a further operation mode, the procedure 300 includes an operation 312 in which the intake valve opening of intake valve 22 is retarded or delayed during the intake stroke of piston 16, which extracts further work from the very late injection provided during recompression. The delayed intake valve opening allows further pre-heating of the in-cylinder charge and the creation of EGR constituents at the start of the next combustion cycle when the intake valve is opened. In one embodiment, the intake valve is timed to open when the in-cylinder pressure is at or around the intake manifold pressure. In one embodiment, the intake valve opening is retarded to at least 60 degrees after TDC of the exhaust stroke.

The system and methods described herein employ a "two stroke" or "every stroke" combustion event cycle where a combustion event occurs every time the piston 16 is near TDC during a 4-stroke, 720 degree combustion cycle. The disclosed systems and methods involve adjusting one or more operating conditions by one or more of early exhaust valve opening and closing to provide recompression of exhaust gases, re-compression injection of fuel, and retarded intake valve opening, to increase the exhaust temperature and/or aftertreatment temperature and/or internal EGR fraction to achieve a target condition.

The control procedures implemented by the controller 80 can be executed by a processor of controller 80 executing program instructions (algorithms) stored in the memory of the controller 80. The descriptions herein can be implemented with system 10. In certain embodiments, the system 10 further includes a controller 80 structured or configured to perform certain operations to control system 10 in achieving one or more target conditions. In certain embodiments, the controller forms a portion of a processing subsystem including one or more computing devices having memory, processing, and communication hardware. The controller may be a single device or a distributed device, and the functions of the controller 80 may be performed by hardware and/or by instructions encoded on a computer readable medium.

In certain embodiments, the controller 80 includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on a non-transient computer readable storage medium, and modules may be distributed across various hardware or other computer components.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Figure 4:
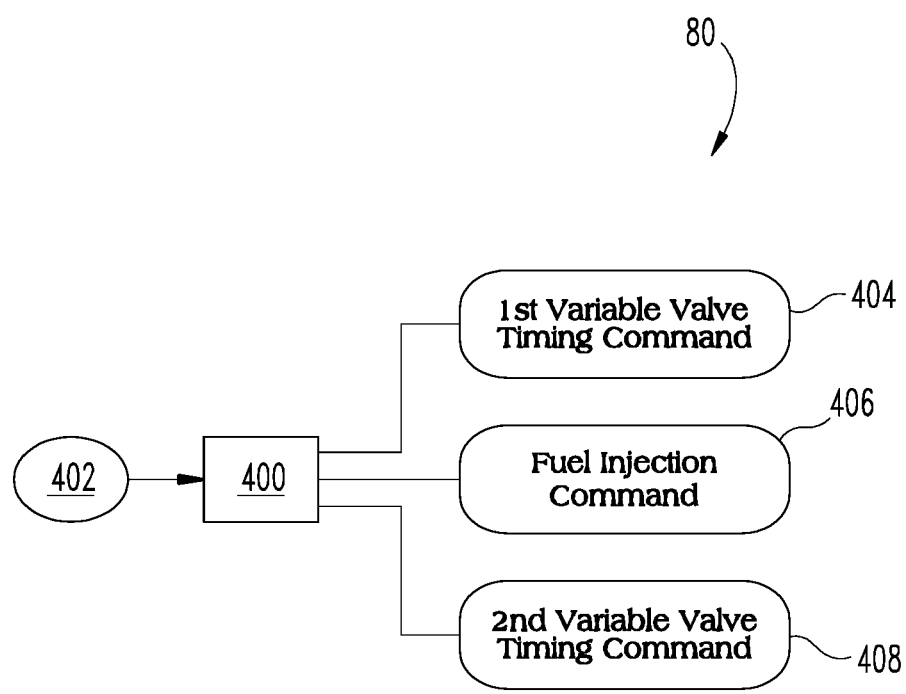
FIG. 4 is a schematic of a control apparatus for managing combustion and thermal outputs of the engine.

Referring to FIG. 4, one embodiment of a controller 80 is shown as a controller apparatus 400. Controller apparatus 400 receives various inputs 402 from the signals off the sensors disclosed herein in order to determine whether or not a thermal management condition for the exhaust gas and/or aftertreatment device(s) is present. The controller apparatus 400 is configured to provide a variable valve timing command 404 in response to the thermal management condition to advance an exhaust valve opening and an exhaust valve closing of one or more of the exhaust valves so that respective ones of the exhaust valves are closed before top dead center during an exhaust stroke of the associated piston to recompress exhaust gas in the associated cylinder during the exhaust stroke by the piston. The controller apparatus 400 is further configured to provide a fuel injection command 406 in response to the thermal management condition to inject an amount of fuel into the associated cylinder during recompression of the exhaust gas to increase a temperature and a pressure of the exhaust gas in the associated cylinder. In a further embodiment, the controller apparatus 400 is further configured to provide a second variable valve timing command 408 in response to the thermal management condition to retard an intake valve opening of intake valves of the plurality of cylinders during an intake stroke of the piston of the associated cylinder immediately after recompression of the exhaust gas in the associated cylinder. The controller apparatus 400 can determine or receive an in-cylinder pressure and the second variable valve timing command 408 is timed so the intake valve opening during the intake stroke occurs in response to the in-cylinder pressure of the associated cylinder being at or around an intake manifold pressure.

Various aspects of the present disclosure are contemplated. According to one aspect, a method includes operating an internal combustion engine system that has an internal combustion engine with a plurality of cylinders to receive a charge flow from an intake system, an exhaust system for receiving exhaust gas produced by combustion of a fuel provided to at least a portion of the plurality of cylinders from a fueling system in response to a torque request, and at least one aftertreatment device in the exhaust system. In response to a thermal management condition of at least one of the at least one aftertreatment device and the exhaust gas, the method includes advancing an exhaust valve opening and an exhaust valve closing of one or more of the plurality of cylinders so that the exhaust valve is closed before top dead center during an exhaust stroke of a piston in the one or more cylinders and exhaust gas in the one or more cylinders is recompressed during the exhaust stroke by the piston, and injecting an amount of fuel into the one or more cylinders during recompression of the exhaust gas to increase a temperature and a pressure of the recompressed exhaust gas in the cylinder.

In one embodiment of the method, the exhaust valve opening and the exhaust valve closing are each advanced at least 40 crank angle degrees so the exhaust valve closes at least 40 degrees before top dead center. In another embodiment of the method, the exhaust gas captured during recompression is recirculated into an intake manifold of the engine when an intake valve of the one or more cylinders is opened during an intake stroke immediately following the exhaust stroke.

In yet another embodiment, the method includes retarding an intake valve opening of an intake valve of the one or more cylinders during an intake stroke of the piston in the one or more cylinders immediately following the exhaust stroke. In a refinement of this embodiment, the intake valve opening is timed to open the intake valve in response to an in-cylinder pressure in the one or more cylinders corresponding to an intake manifold pressure.

In a further embodiment, the method includes dosing hydrocarbons into the exhaust system upstream of the aftertreatment device during the exhaust stroke. In yet another embodiment, the thermal management condition includes at least one of the exhaust gas and the at least one aftertreatment device being below a target temperature.

In another aspect, a system includes an internal combustion engine with a plurality of cylinders that receive a charge flow from an intake system, an exhaust system for receiving exhaust gas produced by combustion of a fuel provided to at least a portion of the plurality of cylinders from a fueling system in response to a torque request, and at least one aftertreatment device in the exhaust system. The system includes a plurality of sensors operable to provide signals indicating operating conditions of the system and a variable valve actuation mechanism configured to control an opening and closing timing of exhaust valves associated with the plurality of cylinders. The system also includes a controller connected to the plurality of sensors operable to interpret the signals from the plurality of sensors. The controller, in response to a thermal management condition of at least one of the exhaust gas and the at least one aftertreatment device, is configured to control the variable valve actuation mechanism to advance an exhaust valve opening and an exhaust valve closing of the exhaust valves so that respective ones of the exhaust valves are closed before top dead center during an exhaust stroke of a piston in the associated one of the plurality of cylinders to recompress exhaust gas in the associated cylinder during the exhaust stroke by the piston. The controller is also configured to control the fueling system to inject an amount of fuel into the associated cylinder during recompression of the exhaust gas to increase a temperature and a pressure of the exhaust gas in the associated cylinder.

In one embodiment, the controller is further configured to advance the exhaust valve opening and advance the exhaust valve closing at least 30 crank angle degrees so the exhaust valve closes at least 30 degrees before top dead center of the piston during the exhaust stroke. In another embodiment, the exhaust gas captured during recompression is recirculated into an intake manifold of the engine in response to an intake valve of the associated cylinder being opened during an intake stroke of the associated piston immediately following the exhaust stroke.

In yet another embodiment, the controller is further configured to retard an intake valve opening of respective intake valves of the plurality of cylinders after recompression of the exhaust gas during an intake stroke of the associated piston immediately following the exhaust stroke. In a refinement of this embodiment, the controller is configured to time the opening of the respective intake valve during the intake stroke to occur in response to an in-cylinder pressure in the associated cylinder being at or around an intake manifold pressure.

In a further embodiment, the system includes a turbocharger including a compressor in the intake system and a turbine in the exhaust system. In a refinement of this embodiment, the turbine includes a wastegate for bypassing exhaust gas around the turbine. In yet another embodiment, the system includes a hydrocarbon injector connected to the exhaust system upstream of the at least one aftertreatment device, and the hydrocarbon injector is connected to a hydrocarbon source.

According to another aspect, an apparatus includes a controller configured for connection to a plurality of sensors operable to interpret a thermal management condition of an exhaust system in response one or more signals from the plurality of sensors during operation of an internal combustion engine. The controller is configured to provide a variable valve timing command in response to the thermal management condition to advance an exhaust valve opening and an exhaust valve closing of one or more exhaust valves of the engine so that respective ones of the exhaust valves are closed before top dead center during an exhaust stroke of a piston in an associated one of a plurality of cylinders of the engine to recompress exhaust gas in the associated cylinder during the exhaust stroke by the piston. The controller is further configured to provide a fuel injection command in response to the thermal management condition to inject an amount of fuel into the associated cylinder during recompression of the exhaust gas to increase a temperature and a pressure of the exhaust gas in the associated cylinder.

In one embodiment, the variable valve timing command advances the exhaust valve opening and advances the exhaust valve closing at least 30 crank angle degrees from a nominal exhaust valve opening so the exhaust valve closes at least 30 degrees before top dead center of the piston during the exhaust stroke. In another embodiment, the exhaust gas captured during recompression is recirculated into an intake manifold of the engine in response to an intake valve of the associated cylinder being opened during an intake stroke of the piston immediately following the exhaust stroke.

In a further embodiment, the controller is further configured to provide a second variable valve timing command in response to the thermal management condition to retard an intake valve opening of intake valves of the plurality of cylinders during an intake stroke of the piston of the associated cylinder immediately after recompression of the exhaust gas in the associated cylinder. In a refinement of this embodiment, the second variable valve timing command times the intake valve opening during the intake stroke to occur in response to the in-cylinder pressure of the associated cylinder being at or around an intake manifold pressure.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    operating an internal combustion engine system including
      an internal combustion engine with a plurality of cylinders that receive a charge flow from an intake system,
      an exhaust system for receiving exhaust gas produced by combustion of a fuel provided to at least a portion of the plurality of cylinders from a fueling system in response to a torque request, and at least one aftertreatment device in the exhaust system;

in response to a thermal management condition of at least one of the at least one aftertreatment device and the exhaust gas determined by a controller, advancing an exhaust valve opening and an exhaust valve closing of one or more of the plurality of cylinders in response to one or more commands from the controller so that the exhaust valve is closed before top dead center during an exhaust stroke of a piston in the one or more cylinders and exhaust gas in the one or more cylinders is recompressed during the exhaust stroke by the piston; and injecting an amount of fuel into the one or more cylinders during recompression of the exhaust gas in response to one or more commands by the controller to increase a temperature and a pressure of the recompressed exhaust gas in the cylinder.

2. The method of claim 1, wherein the exhaust valve opening and the exhaust valve closing are each advanced at least 40 crank angle degrees so the exhaust valve closes at least 40 degrees before top dead center.

3. The method of claim 1, wherein the exhaust gas captured during recompression is recirculated into an intake manifold of the engine when an intake valve of the one or more cylinders is opened during an intake stroke immediately following the exhaust stroke.

4. The method of claim 1, further comprising, in response to one or more commands from the controller, retarding an intake valve opening of an intake valve of the one or more cylinders during an intake stroke of the piston in the one or more cylinders immediately following the exhaust stroke.

5. The method of claim 4, wherein the intake valve opening is timed to open the intake valve in response to an in-cylinder pressure in the one or more cylinders corresponding to an intake manifold pressure.

6. The method of claim 1, further comprising, in response to one or more commands from the controller, dosing hydrocarbons into the exhaust system upstream of the aftertreatment device during the exhaust stroke.

7. The method of claim 1, wherein the thermal management condition includes at least one of the exhaust gas and the at least one aftertreatment device being below a target temperature.

8. A system, comprising:
an internal combustion engine including a plurality of cylinders that receive a charge flow from an intake system, an exhaust system for receiving exhaust gas produced by combustion of a fuel provided to at least a portion of the plurality of cylinders from a fueling system in response to a torque request, and at least one aftertreatment device in the exhaust system;

a plurality of sensors operable to provide signals indicating operating conditions of the system;

a variable valve actuation mechanism configured to control an opening and closing timing of exhaust valves associated with the plurality of cylinders;

a controller connected to the plurality of sensors operable to interpret the signals from the plurality of sensors, wherein the controller, in response to a thermal management condition of at least one of the exhaust gas and the at least one aftertreatment device, includes a non-transitory computer-readable medium with instructions stored thereon, that when executed by a processor, perform the steps comprising:

controlling the variable valve actuation mechanism to advance an exhaust valve opening and an exhaust valve closing of the exhaust valves so that respective ones of the exhaust valves are closed before top dead center during an exhaust stroke of a piston in the associated one of the plurality of cylinders to recompress exhaust gas in the associated cylinder during the exhaust stroke by the piston; and controlling the fueling system to inject an amount of fuel into the associated cylinder during recompression of the exhaust gas to increase a temperature and a pressure of the exhaust gas in the associated cylinder.

9. The system of claim 8, wherein the steps is further comprise advancing the exhaust valve opening and advancing the exhaust valve closing at least 30 crank angle degrees so the exhaust valve closes at least 30 degrees before top dead center of the piston during the exhaust stroke.

10. The system of claim 8, wherein the exhaust gas captured during recompression is recirculated into an intake manifold of the engine in response to an intake valve of the associated cylinder being opened during an intake stroke of the associated piston immediately following the exhaust stroke.

11. The system of claim 8, wherein the steps further comprise retarding an intake valve opening of respective intake valves of the plurality of cylinders after recompression of the exhaust gas during an intake stroke of the associated piston immediately following the exhaust stroke.

12. The system of claim 11, wherein the steps further comprise timing the opening of the respective intake valve during the intake stroke to occur in response to an in-cylinder pressure in the associated cylinder being at or around an intake manifold pressure.

13. The system of claim 8, further comprising a turbocharger including a compressor in the intake system and a turbine in the exhaust system.

14. The system of claim 13, wherein the turbine includes a wastegate for bypassing exhaust gas around the turbine.

15. The system of claim 8, further comprising a hydrocarbon injector connected to the exhaust system upstream of the at least one aftertreatment device, wherein the hydrocarbon injector is connected to a hydrocarbon source.

16. An apparatus, comprising:
a controller configured for connection to a plurality of sensors wherein the controller includes a non-transitory computer-readable medium with instructions stored thereon, that when executed by a processor, perform the steps comprising: interpreting a thermal management condition of an exhaust system in response one or more signals from the plurality of sensors during operation of an internal combustion engine, providing a variable valve timing command in response to the thermal management condition to advance an exhaust valve opening and an exhaust valve closing of one or more exhaust valves of the engine so that respective ones of the exhaust valves are closed before top dead center during an exhaust stroke of a piston in an associated one of a plurality of cylinders of the engine to recompress exhaust gas in the associated cylinder during the exhaust stroke by the piston, and providing a fuel injection command in response to the thermal management condition to inject an amount of fuel into the associated cylinder during recompression of the exhaust gas to increase a temperature and a pressure of the exhaust gas in the associated cylinder.

17. The apparatus of claim 16, wherein the variable valve timing command advances the exhaust valve opening and advances the exhaust valve closing at least 30 crank angle degrees from a nominal exhaust valve opening so the exhaust valve closes at least 30 degrees before top dead center of the piston during the exhaust stroke.

18. The apparatus of claim 16, wherein the exhaust gas captured during recompression is recirculated into an intake manifold of the engine in response to an intake valve of the associated cylinder being opened during an intake stroke of the piston immediately following the exhaust stroke.

19. The apparatus of claim 16, wherein the steps further comprise providing a second variable valve timing command in response to the thermal management condition to retard an intake valve opening of intake valves of the plurality of cylinders during an intake stroke of the piston of the associated cylinder immediately after recompression of the exhaust gas in the associated cylinder.

20. The apparatus of claim 19, wherein the second variable valve timing command times the intake valve opening during the intake stroke to occur in response to the in-cylinder pressure of the associated cylinder being at or around an intake manifold pressure.

\* \* \* \* \*